June 5, 1962

J. L. TUCK 3,037,921

METHOD AND APPARATUS FOR PRODUCING
NEUTRONS AND OTHER RADIATIONS

Filed Feb. 25, 1955

WITNESSES

INVENTOR.
JAMES L. TUCK
BY ATTORNEY

Fig. 3

June 5, 1962  J. L. TUCK  3,037,921
METHOD AND APPARATUS FOR PRODUCING
NEUTRONS AND OTHER RADIATIONS
Filed Feb. 25, 1955  3 Sheets-Sheet 3

WITNESSES
Ralph Carlile Smith
A. Fredrick Hamann

INVENTOR.
JAMES L. TUCK
BY ATTORNEY
Roland A. Anderson 3,037,921
METHOD AND APPARATUS FOR PRODUCING NEUTRONS AND OTHER RADIATIONS
James L. Tuck, Los Alamos, N. Mex., assignor to the United States of America as represented by the United States Atomic Energy Commission
Filed Feb. 25, 1955, Ser. No. 490,705
9 Claims. (Cl. 204—154.2)

The present invention relates to high temperature gaseous systems, and more particularly to methods and means for producing neutrons by the interaction of ions of a plasma of light elements heated to a high temperature by the pinch effect.

In general there are two ways in which nuclear reactions may be made to take place. The first of these methods involves increasing the temperature of a volume of gas to such a high temperature that the nuclei will acquire sufficient kinetic energy to overcome the electrostatic repulsion which normally prevents interaction. This method is generally referred to as a fusion reaction, and takes place in the sun and stars. The second method involves the bombardment of a target nuclei by other nuclei which, for example, have been accelerated by such devices as the cyclotron, synchrocyclotron, etc., until they have relative velocities equivalent to many million degrees. This method also involves fusion reactions, but is distinguishable from the first method in that the interacting nuclei are not thermalized at an average energy, as the accelerated nuclei have very high energies while the target nuclei have an average energy corresponding to room temperature. The generic term "fusion reaction" includes the specific term "thermonuclear reaction," the latter connoting a fusion reaction between nuclei which are thermalized at such an extremely high temperature, e.g., $10^8$° K., that more energy is released in the product nuclei alone per unit volume of plasma than is required to heat it to such temperature.

The present invention is particularly concerned with the first of these two methods, and has as its general objective the creation of very high temperatures in a fusion fuel, which temperature can be created and fully controlled in the hereinafter described apparatus.

The attainment of this objective involves the acceleration of nuclei of a gaseous fusion fuel in such a manner that the velocity distribution of the gas is random, and each nucleus is subjected to frequent collisions. Thus, the nuclei will not be accelerated lineally, as is the case in linear accelerators or accelerated particle beam sources, but will be accelerated in a random manner thereby increasing the kinetic energy of random motion of each particle and consequently the temperature of the gas.

More specifically it is the object of the present invention to provide a method and apparatus for causing fusion reactions.

A further object of the present invention is to provide such a method and apparatus for causing fusion reactions wherein a gas is ionized and so energized as to attain high temperatures.

A still further object of the present invention is to provide such an apparatus and method for causing fusion reactions wherein an ionized gas is energized to attain high temperatures, and wherein said energized ionized gas is confined by means of the self-constricting properties of an ionized current carrying gas.

A still further object of the present invention is to provide such a method and apparatus for causing fusion reactions utilizing an energized, ionized, pinched, current carrying gas, wherein said gas consists of a fusion fuel.

A still further object of the present invention is to provide such a method and apparatus for causing fusion reactions utilizing an energized, ionized, pinched, current carrying fusion fuel in the form of a gas, wherein said fusion reactions are periodical in nature.

A still further object of the present invention is to provide such a method and apparatus for causing a periodical burst of fusion reactions utilizing an energized, ionized, pinched, current carrying fusion fuel in the form of a gas, wherein the energy liberated by said method and in said apparatus includes energy in the form of bremsstrahlung, and accelerated neutrons, protons, tritons, $He^3$, and alpha particles.

The objects and advantages as well as the relationship of the various considerations and theories outlined below will become more apparent from the following description of the several embodiments of the invention, including also certain novel structure illustrated in the annexed drawings hereby made a part of this specification, wherein:

*General Considerations*

In considering the nuclear interaction between atoms in a gas, the probability of such interaction taking place is determined by the Coulomb barrier. This barrier is the electrostatic repulsion which an approaching particle experiences as it advances toward another particle of similar charge. In order to increase the number of nuclear interactions, the probability of a reaction occurring can be increased by raising the temperature of the nuclei and/or by increasing the number of collisions, i.e., by raising the density. If such a system is made large enough, so that a large fraction of the nuclear energy so produced is not lost but represents a gain to the system, it will heat itself.

Thus, there exists what may be considered a critical mass for deuterium, for example, which would start to heat itself up spontaneously from room temperature. However, in order to obtain a sustained reaction in deuterium the mass required would approximate the size of the moon.

In order, therefore, to obtain a system wherein the mass is a more reasonable size, energy losses from penetrating radiations, escaping charged particles, neutrons, bremsstrahlung and conduction to the walls must be reduced.

To substain such a reaction i.e., to obtain a reasonable number of fusion reactions during each cycle of operation, a local energy balance must be established, i.e., fusion energy generated locally plus energy deposited from the outside locally must be equal to or greater than the losses consisting of bremsstrahlung and transport to the outside.

To obtain such burst of fusion reactions, the fusion fuel, in the form of an ionized gas, must be insulated from the walls of the confining chamber, otherwise the heat losses to the walls will preclude the attainment of high temperatures. The confinement of the ionized gas column to a volume at or near the center of the confining chamber is accomplished in the present invention by an arrangement and association of components in such a manner that the advantages of a natural phenomenon may be utilized. This phenomenon is referred to as the pinch effect, and is described in detail hereinafter in the section entitled "Pinch Effect."

Utilizing the pinch effect to obtain a highly pinched discharge, i.e., the electrons as well as the positive ions constricted by means of the self-magnetic field to a small volume at the axis of a confining chamber, the current density will be high near the center and approach zero at the walls. Furthermore, the number of particles escaping to the walls from the constricted discharge will be small in number, since the energy required to attain this escape against the force of the constricting magnetic field will be improbably great. Also, since a highly ionized gas is being considered, the number of uncharged particles escaping from the pinched discharge will result in no great loss of energy. Thus, if the temperature within the constricted discharge is of a very high value, the energy loss to the walls in the form of escaping charged and uncharged particles is not serious. Therefore, the volume between the pinched discharge and the walls is essentially a very high vacuum, and, thus, no transport losses of appreciable quantity will be present.

Under these considerations, any energy supplied from the outside, by means of electric fields parallel to the electrons path for example, will result in a greater kinetic energy within the gas which will effectively increase the temperature of the gas. If the gas consists of a fusion fuel, as the temperature increases an increasing number of fusion reactions will take place within the gas which will liberate neutrons, protons, tritons, alpha particles, and $He^3$.

The neutrons liberated by the reactions taking place within the gas will have energies of from 2 to 14 mev, and will penetrate the confining walls resulting in the creation of only a small amount of heat in this area. However, by placing a medium around the device which consists of a material having a large neutron capture cross-section, the absorption of these energized particles will result in the production of heat and/or useful by-products.

*Fusion Fuels*

The fuels considered are the isotopes of the light elements, for example deuterium or a mixture of tritium and deuterium.

The (D, D) reaction is $$_1H^2 + {_1H^2} \rightarrow \begin{cases} _2He^3 + 0.8 \text{ mev.} + {_0n^1} + 2.5 \text{ mev.} \\ _1H^3 + 1.0 \text{ mev.} + {_1H^1} + 3.0 \text{ mev.} \end{cases} \quad (1)$$

The (T, D) reaction is $$_1H^3 + {_1H^2} \rightarrow {_2He^4} + 3.5 \text{ mev.} + {_0n^1} + 14.1 \text{ mev.} \quad (2)$$

Another reaction of importance concerns the $He^3$ produced in Equation 1 above, which is, $$_2He^3 + {_0n^1} \text{ (thermal)} \rightarrow {_1H^3}$$
$$+ 0.2 \text{ mev.} + {_1H^1} + 0.6 \text{ mev.} \quad (3)$$

In the case of a fusion reaction in deuterium, the tritium formed has a high probability of reacting with more deuterium. The $He^3$, which has a small probability of reacting with deuterium directly, can yield more tritium by capture of a thermal neutron, since it has a large capture cross-section.

Totaling the gross deuterium consumption in primary and secondary reactions we find, $$3 {_1H^2} \rightarrow {_2He^4} + {_1H^1} + {_0n^1} + 21.7 \text{ mev.} \quad (4)$$

if the $He^3$ is consumed, or $$5 {_1H^2} \rightarrow {_2He^4} + {_2He^3} + {_1H^1} + 2 {_0n^1} \rightarrow 25 \text{ mev.} \quad (5)$$

if the $He^3$ is not consumed.

The pinch or constricting effect on the electron and ion stream is due to the effect of the magnetic attractions between the parts of the stream. How such a pinch effect may take place can be seen in the following manner. Consider a stream of high velocity electrons, i.e., an electric current within a gas, moving in a given direction, and positive ions moving in the opposite direction. If the charge density of the positive ions is everywhere equal to the charge density of the electrons, the Coulomb attractions and repulsions cancel. However, the magnetic forces created by the current flow will attract the charged particles toward the center of the current distribution. Thus, it is apparent that a stream of electrons will be magnetically self-pinching, provided the current is greater than a value which can be calculated from the initial stream conditions. The current magnitude required to obtain a pinch effect can be determined to a first approximation by the equation, $$I^2 = 3.2 \times 10^{-7} NT$$

where
$I$ = current in amperes,
$N$ = total particles per unit length of stream, and
$T$ = temperature in Kev.

See also Bennett, Phys. Rev., 45 890 (1934).

In the present device a toroidal chamber provides the accelerated gas particles and electrons with an endless path. The low pressure gas is initially ionized, and is thereafter subjected to the action of electric fields created in the gas by means hereinafter described. The effect of these fields is to accelerate the electrons around the toroid in one given direction, and the positive ions in the other, with the result that a current is created in the gas. This current increases and attains values of the order of fifty thousand amperes. These high currents give rise to the phenomenon referred to above as the pinch effect. Thus, the electron currents, which up to the time the pinch effect became dominant had a cross-sectional area equivalent to the confining chamber, are concentrated along the axis of the chamber. Obviously, the positive ions will also be constricted, since the electrons will drag the ions toward the center in order to maintain a net space charge of zero. By this confinement the energy losses to the walls are drastically reduced and the current density along the axis is increased. As the current density is increased, the electrons, which along with the ionized gas particles are concentrated along the axis of the confining chamber, and which have the greatest mobility, are accelerated by the electric field, and by means of collisions pass energy onto the heavier gas particles. These collisions will increase the random velocity of the gas particles, thereby increasing the temperature of the gas. As the temperature of the gas increases, the number of fusion reactions increases. These reactions will liberate large quantities of bremsstrahlung, neutrons, protons, tritons, alpha particles, and $He^3$.

Although the theoretical treatment of the above-described phenomenon is not complete, it has been found both theoretically and physically that the pinch effect is *not* stable against lateral displacement. This instability is commonly referred to in the art is "kink" or "Kruskal-Swartzchild" instability. This phenomenon, as presently understood from a physical standpoint, means that a pinched discharge can be maintained for only short periods of time before this instability takes place and scatters the ionized gas against the confining chamber.

Physically this means that a device having the operating characteristics of the present invention, i.e., for example, an initial potential applied to the discharge of at least 5 volts per cm for a time duration of from 5 to 500 μsec., will not be a continuously operating device, but will rather be a pulsed type reactor. Therefore, the heat created in the surrounding liquid coolant will be periodic in nature. However, the period will be so short that from a practical standpoint the heating may be considered as constant.

While the exact details of the mechanisms, reactions and phenomenon described above are not yet completely understood, the theory and assumed physical significance have been discussed in an attempt to clarify the nature of the invention. However, no limitation in the invention is thereby intended.

Apparatus

The confining chamber in which the fusion reactions are made to take place consists of a toroidal reaction chamber 11 (see FIGURE 1) having, for example, a major diameter of 100 cm. and a minor diameter of 10 cm. This toroid is constructed of a non-magnetic and high electrically resistant material. The toroidal reaction chamber 11 may be fabricated from a series of separate segments or as a welded or fused unit, preferably the latter, since coolant turbulence along its periphery would thereby be minimized. Furthermore, as pointed out above, because of the bremsstrahlung heating of the walls of the toroidal reaction chamber, the melting point of the material used should be high. One material which fulfills these requirements is fused quartz. However, since a highly corrosive cooling medium will be circulated around the outer surface of the toroidal chamber, one other condition arises, namely, that at high temperatures, for example, 300 to 600° C., the material so chosen must have a high corrosion resistance. Thus, in the presently described preferred embodiment wherein the primary coolant is a sodium-potassium alloy, the toroidal reaction chamber 11 is made of zirconium, which has good corrosive properties as well as a comparatively high electrical resistivity.

Figure 1:
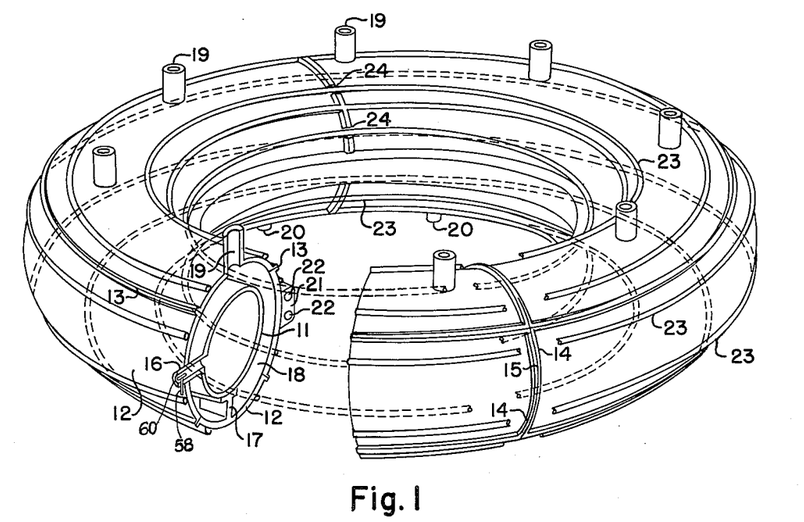
FIGURE 1, shows an endless chamber in the form of a toroid sectioned to show the internal components.

Surrounding the reaction chamber 11 and spaced therefrom is a second toroidal chamber indicated generally as 12. This second chamber, hereinafter referred to as the primary coolant jacket, consists of eight sections. Each of these sections describes a half circle of major toroidal diameter and a quarter circle of minor toroidal diameter. Each section has two longitudinal flanges 13 and two cross-sectional flanges 14. Thus, upon assembly a toroidal chamber of greater minor diameter than that of toroidal reaction chamber 11 is obtained. An insulator 15 may be placed between the assembled flanges 14 to prevent the passage of electrical currents around the jacket as hereinafter described in more detail.

Integral with the toroidal reaction chamber 11, and extending through the cooling jacket 12, are two tubular gas passage members 16, only one being shown in the drawings, located in diametrically opposed relation, and extending outwardly with relation to the major radial center of the toroid. These tubular members are sealed to the primary cooling jacket 12 by means of a seal or by welding or brazing. The purpose of these tubular members and the resulting opening into the toroidal reaction chamber will be apparent in the hereinafter described gas supply system and the description of the operation of the device.

Since the toroidal chamber 11 and the primary cooling jacket 12 have coincident major axes, the tubular gas passage members 16 serve to support the toroidal reaction chamber 11 against displacement due to the flow of the liquid coolant around its periphery. However, further supports 17, only one being shown in the drawings, are provided between the inner surface of the bottom of the primary cooling jacket 12 and the outer surface of the toroidal reaction chamber 11. These supports may be integral with the cooling jacket, and are preferably of light construction to minimize local heating at their point of contact with the reaction chamber 11.

The coolant, a sodium-potassium alloy in the presently described embodiment, enters the area 18 between the reaction chamber 11 and the cooling jacket 12 by means of upwardly extending tubes 19. These tubes 19 are connected, as pointed out hereinafter, to the coolant supply. The lower openings 20, located in intermediate relation with respect to the tubes 19, carry the heated liquid to the heat exchanging apparatus.

Around the inner periphery of the primary cooling jacket is a bracket 21 integrally attached to the jacket 12. Two wires 22 are carried by bracket 21 in such a manner that they are symmetrically disposed upon each side of the plane described by the minor toroidal axis of the reaction chamber 11. These wires 22 constitute a coil, the purpose of which will become apparent in the hereinafter described operation of the device.

The above-described assembly, hereinafter referred to as the toroidal assembly, constitutes a basic component of the various embodiments described hereinafter. As mentioned above, the pinch effect upon which the present device depends, requires the inducement of a current in an ionized gas. Although many means of inducing a current within an ionized gas may be apparent, two specific embodiments are described by way of example.

The first of these embodiments is shown in FIGURE 1. In this embodiment, the pinch effect is created by means of a primary coil indicated generally at 23. A detail view of one type of coil which may be used is shown in FIGURE 1, wherein the coil consists of a series of windings. These windings are, in the present embodiment, eight in number, and are symmetrically spaced around the periphery of the coolant jacket 12. It should be noted, however, that the number of such windings is not critical provided they are symmetrically located. A primary coil in the form of a sheath around the outside of the chamber 11 has been found satisfactory. The windings 23 form circles with the major axis center as their center. The electrical connections to those windings will be described in more detail in the hereinafter described primary coil circuit.

In order to preserve electrical symmetery with respect to the major toroidal axis, the flanges 14 are notched as at 24 so that the coil is at all times equidistant from the major axis. However, other means (not shown) such as supports to hold the coils away from the coolant jacket 12 could be provided, since the distance from the coils to the major toroidal axis, within large undefined limits, does not effect the function of the coil.

Figure 2:
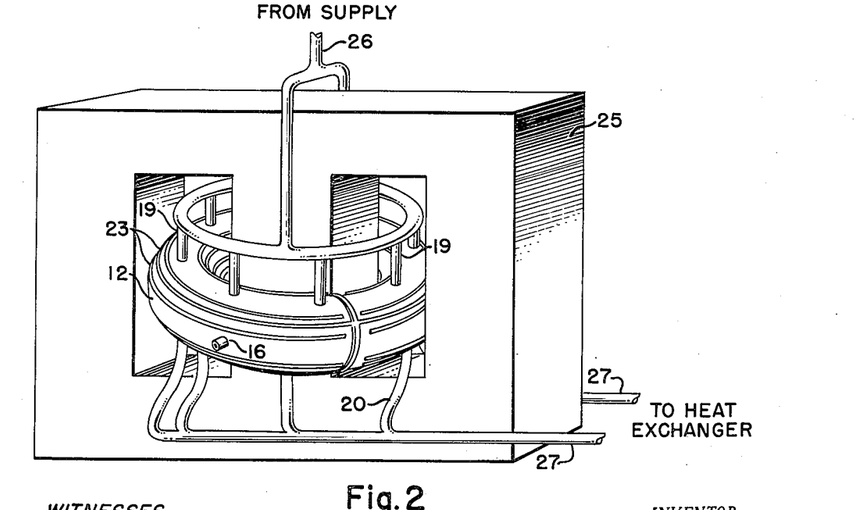
FIGURE 2 is an assembly of the chamber of FIGURE 1 with a transformer core.

The toroidal assembly, plus the external primary windings 23, is assembled around the core of an iron magnet 25, in the embodiment shown in FIGURE 2, and supported therein any conventional manner.

The coolant inlets 19 are connected to a common supply pipe 26 which is connected to the sodium-potassium supply tank (not shown). The coolant outlets 20 are connected to heat exchanger lead pipes 27. The heat exchanging apparatus, and subsequent power producing facilities are not shown, and may be of any conventional design and arrangement known in the art.

Figure 3:
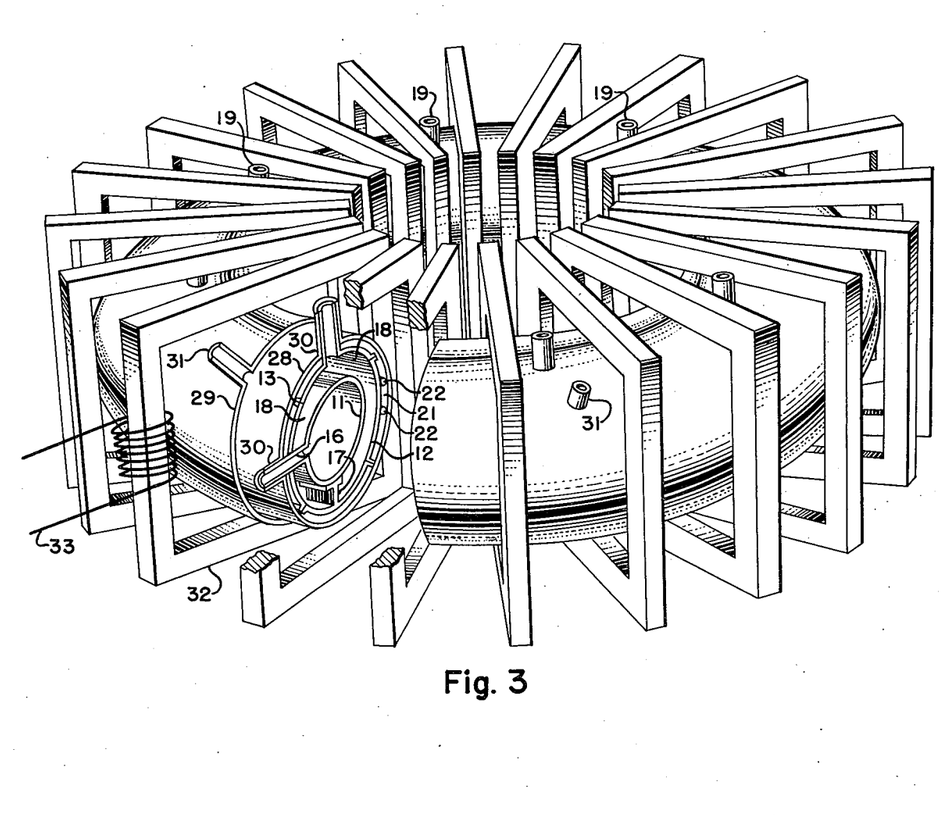
FIGURE 3 is a modified toroidal chamber assembled within a series of transformer cores.

Referring now to FIGURE 3, which shows a modification of the present invention, the toroidal assembly consists of a toroidal reaction chamber 11 fabricated from tantalum. Tantalum is used in this embodiment since it has good electrical resistivity, and is highly resistant to corrosion by liquid lithium. Liquid lithium is used as a coolant in the present embodiment for purposes which will be apparent in the hereinafter discussed operation of the device. However, since the melting point of lithium is considerably higher, i.e., about 185° C., than the melting point of the sodium-potassium alloy employed as a coolant in the previously described embodiment of the present invention, additional means must be incorporated into the device to (1) absorb the heat during shutdown or (2) keep the lithium liquid during shutdown. The reasons for these factors will be apparent from the description of the operation of the present device.

The remainder of the toroidal assembly is constructed in the same manner as in the previously described embodiment, except that in the present embodiment the various components, including the primary coolant jacket 12, tubular gas passage members 16, supports 17, coolant inlets 19, and coolant outlets 20 are fabricated from tantalum.

In the present embodiment a second cooling jacket consisting of inner jacket 28 and outer jacket 29 is provided. This jacket is provided to carry a coolant which is liquid at room temperatures, such as a sodium-potassium alloy, for use during shutdown and start-up operations as described hereinafter in the operation of the device. The inner jacket 28 is concentric with the reaction chamber 11 and is spaced from the cooling jacket 12. This inner jacket is fabricated from a sodium-potassium corrosion resistant material, for example, zirconium. Since the tubular gas passage members 16, coolant inlets 19, and coolant outlets 20, are fabricated from a lithium corrosion resistant material, which in most instances will not resist attack by a sodium-potassium alloy, tubular members 30, of the same material as the inner coolant jacket 28, are provided around the tubular gas passage members 16, inlets 19, and outlets 20. The outside jacket 29 is provided with several ports 31, located to insure proper cooling of the device during operation as well as during shut-down or start-up.

This entire assembly, hereinafter referred to as the double jacket assembly, is the confining chamber for the fusion fuel which constitutes the secondary of transformers 32. Although twenty such transformers are shown in FIGURE 3, the number is not critical, and is used by way of example only. The number may vary over wide limits, however, symmetry around the double jacket assembly must be maintained as will be apparent in the hereinafter described operation of the device.

Each transformer has a primary winding 33 located on one of its sides. Thus, the transformer constitutes a link between the primary winding 33 and the secondary, the latter being the ionized gas within the reaction chamber 11, as will be apparent in the hereinafter described operation of the device.

It is obvious that the toroidal assembly described in the first embodiment could also be used with the above-described multiple transformer embodiment, or vice versa. It is also obvious that other fluid or liquid coolants and other coolant jacket materials could be used. (See Liquid Metals Handbook, U.S. Government Printing Office, second edition, 1952.)

Gas Supply System

As stated hereinbefore the present invention utilizes a low density ionized gas to produce a thermonuclear reaction. This gas, preferably either deuterium, tritium, or a mixture thereof, is continuously supplied to the reaction chamber 11 through one of the tubular gas passage members 16. Therefore, the following apparatus for supplying the required gas is connected to one of the members 16.

The supply means consists of a supply tank 34 (see FIGURE 4) from which the pure fusion fuel is passed through a pressure regulating valve 35. The regulated gas is then passed through a palladium leak 36. A lead 37 is provided so that the palladium leak 36 may be evacuated before actual operation begins.

Figure 4:
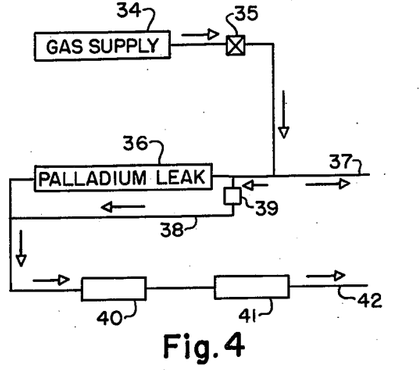
FIGURE 4 is a schematic drawing of the gas supply.

A by-pass line 38 is provided through a normally closed valve 39 so that the entire vacuum system, as well as the reaction chamber 11, can be flushed with gas directly from the gas supply.

The line 38, as well as the output of the palladium leak 36, is fed through gages 40 and 41 to terminal lead 42. The gages 40 and 41 indicate the various gages that may be used in maintaining a constant pressure at the terminal lead 42. More than one gage is usually provided, since the range of working pressures is sufficiently large to require monitoring in several calibrated gage ranges. Thus, the gages may be of the types commonly referred to as Phillips, Pirani, or Ion gages depending upon the pressure at which the present device is operated.

The terminal lead 42 is connected to one of the tubular gas passage members 16, so that the gas, whose rate of flow is governed by the palladium leak 36, will pass directly into the reaction chamber 11.

Vacuum System

Figure 5:
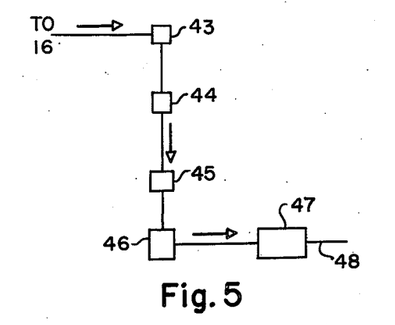
FIGURE 5 is a schematic drawing of the vacuum system.

Connected to the tubular gas passage member 16, i.e., the passage diametrically opposite to the one connected to the gas supply system, is the vacuum system (see FIGURE 5). Since there must be additions of gas to the toroidal reaction chamber 11 to provide new fuel to sustain the fusion reactions taking place and to remove the reaction products, i.e., hydrogen, helium, and to a limited extent tritium and helium[3], the outlet from the reaction chamber to the vacuum system first passes through a flow control valve 43. This valve controls the aperture through which the drawn-off gas passes, and thereby controls the rate of such flow. Attached to the controlled flow aperture of this valve is the vacuum system. This system consists of a large aperture stop cock 44, a liquid air trap 45, a two stage mercury diffusion pump 46, and a standard motor driven vacuum pump 47 vented through outlet 48 to any conventional gas tight container. The reaction products confined to this chamber may then be separated in any manner known to the art. All the latter named elements are well-known in the art.

Initial Ionization System

As pointed out hereinbefore, the operating characteristics of the present device require that the gas present in the toroidal reaction chamber be ionized before the actual operating cycle is begun. For this purpose a pre-operation gas ionizing R.F. system is provided. This R.F. system (see FIGURE 6) consists of the following components. The master oscillator 50 feeds its output of from 5–10 megacycles into a frequency multiplier 51. The output of the multiplier, which has frequencies of from 5 to 110 megacycles, is amplified by power amplifier 52, which has a power output of many kilowatts. This amplifier output is fed through a coaxial cable 53 to a tuning circuit indicated generally at 54.

Figure 6:
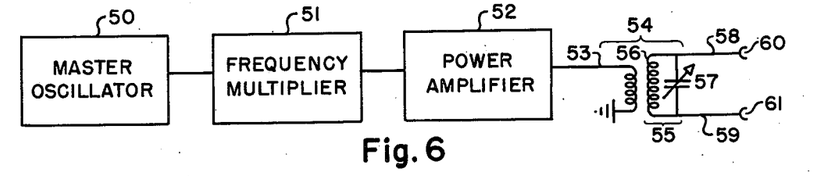
FIGURE 6 is a partially schematic drawing of the initial gas ionizing system.

The above-indicated circuits, i.e., the master oscillator, frequency multiplier and power amplifier circuits, are diagramatically indicated in FIGURE 6, since their respective components and inter-connections are well-known in the art.

The tuning circuit 54 consists of a tank circuit 55 having an impedance coil 56 in parallel with a variable capacitance 57. The tank circuit 55 is impedance coupled to the output of power amplifier 52. Thus, by means of variable capacitance 57, the tank circuit can be tuned to the R.F. output and will have the same frequency as the driving circuit.

The two leads 58 and 59 are the output of the tuning circuits 54, and are connected to semi-cylindrical capacitance electrodes 60 and 61, respectively. The electrode or first plate 60 is sealed within one of the tubular gas passage members 16. The second electrode 61 is sealed within the second tubular gas passage member 16 which is located diametrically opposite to the first member. This electrode constitutes the second plate of a capacitor. Thus, the capacitance between these two electrodes will ionize the gas present between them, i.e., the gas contained within the reaction chamber 11.

Primary Coil Circuit

Figure 7:
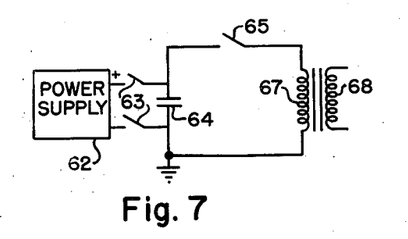
FIGURE 7 is a circuit diagram of the primary coil circuit.

The electrical components connected to the primary coil for initiating the pinch effect consists of the following circuit (see FIGURE 7). The high voltage source 62 is any standard high voltage source which has, for the purpose of the presently described embodiment, an output of 500 kv. at 100 ma. The output from the source 62 is connected through switch 63 to one or more capacitors 64. Although the exact number is not critical, in the present embodiment of the invention 10 capacitors are used, each having a voltage rating of 500 kv. and a capacitance of 0.1 mfd. One side of the capacitors 64 is grounded, while the other side is connected to switch 65 and to the plate of a diode 66. The switch 65 is connected to the primary winding 67 of a transformer. This primary winding 67 diagramatically illustrates either the primary coil 23 (see FIGURE 1) or the primary coil 33 (see FIGURE 3) depending upon which of the two previously described embodiments is used. The secondary 68 of the transformer represents the ionized gas and electrons contained within the reaction chamber 11. Thus, after switch 63 is closed and the capacitors 64 are charged, switch 63 is opened and switch 65 is closed. Upon closing switch 65, the capacitors discharge through primary coil 67 thereby inducing a secondary current in the gas within the reaction chamber 11.

*Operation*

In preparing to operate the present device, a very high vacuum is first attained within the toroidal reaction chamber 11. The gas supply is turned off, and the palladium leak 36 (see FIGURE 4) is evacuated through lead 37 to remove contaminants contained therein. The next operation is to close the lead 37, open the gas supply valve 35 and open valve 39 to permit the gas to by-pass palladium leak 36, so that the gas supply system and the reaction chamber will be flushed with the gas to be used as the thermonuclear fuel. This flushing of the system is continued for a relatively long period of time to insure that the high Z reactants have been removed from the toroidal reaction chamber 11.

The by-pass valve 39 is then closed and the gas flow is thereafter so regulated by the palladium leak 36 that the pressure within the reaction chamber 11 has a value of from 1 to 500 microns, preferably about 10 microns. Although the palladium leak will regulate the flow of gas into the system, the vacuum system (see FIGURE 5) is capable of removing the gas at a faster rate. Therefore, a variable aperture valve 43, of any type well known in the art of vacuum systems, is provided so that the flow of the gas from the system can be regulated to maintain a constant density of about $10^{15}$ particles per cc. (about 30 microns) within the reaction chamber.

The initial ionizing system (see FIGURE 6) is then activated, i.e., and an R.F. field is created between the two electrodes 60 and 61. Since these electrodes are located within the two diametrically opposed tubular gas passage members 16, this field will be divided between two paths, each path circumscribing a half circle. Thus, the gas flowing through the reaction chamber 11, will be subject to this field and will be ionized.

The coolant, a sodium-potassium alloy which is liquid at room temperature, is then circulated through the primary cooling jacket area 18 for the embodiment shown in FIGURE 1. This coolant, stored in any conventional inert atmospheric container, may be pumped by electromagnetic pumps, as is well known in the art, through the primary cooling jacket 12, through a conventional heat exchanger, and then back to the storage container. The heat removal system, other than the primary coolant jacket and inlet and outlet pipes, has not been shown since the apparatus and methods used are well known in the art.

The reactor is now ready for operation. The capacitors 64 (see FIGURE 7) are charged by activating the power supply 62 and by closing the switch 63. Switch 65 is normally open during this operation. Switch 63 is then opened, and switch 65 is closed. Upon closing switch 65 the charge on the capacitors, i.e., 0.5 coulomb in the presently decribed embodiment, is dumped into the primary coil 67 which represents either the primary coils 23 of FIGURE 1, or the primary coils 33 of FIGURE 3. Considering the device shown in FIGURE 1, the current passes through each of the circular coils 23. Since they are in parallel electrical relation, the current will travel in the same direction around each of the circular coils shown. Since the gas within the reaction chamber 11 is ionized, there are numerous free electrons present within the gas. The flow of current through the coil 23 will induce an electron flow within this gas. These free electrons are represented by the secondary coil 68 in FIGURE 7. The transformer 25 shown in FIGURE 2 increases the coupling efficiency of this action. However, it is obvious that an air core transformer could be used.

The induced current in the gas, i.e., the flow of the free electrons and ions within the gas, is around the toroidal chamber 11. It is also apparent that the coils 23 must necessarily be in parallel electrical relation so that the induced electron current created within the gas will be unidirectional. As the electrons are accelerated, their energy is passed onto the ions by collisions. These collisions, as explained above, give rise to Bremsstrahlung. Furthermore, the secondary current continues to increase during the presence of the inducing current, and attains values greater than 50,000 amperes. This value is well over the theoretically predicted minimum current requirement for attaining a pinched discharge.

This large electron flow will pinch or constrict in accordance with the above-described pinch effect. As the electrons are constricted, the ions will be dragged toward the center of the confining chamber so that a net space charge of zero will be maintained.

It is apparent that the particle flow around the toroidal chamber will tend to move in an outward radial direction, since there is a stronger, i.e., condensed, self-magnetic field pressure on the inside, and the particles would, therefore, ordinarily contact the outer periphery of the confining chamber. However, in the present device an attracting field is created along the inner periphery of the toroid by passing a current through coils 22. These coils, symmetrically located with relation to the pinched discharge, will counterbalance the radial forces, and thereby hold the discharge at the center of the confining chamber. This current may be a continuous flowing D.C. current, the exact value of which will depend upon the major toroidal radius, its proximity to the pinch, and the number of such coils used. Thus, routine experiment is required in order to determine its exact value.

Obviously the coils 22 could be placed on the outer periphery of the torus, and a repelling force created by passing a current in the opposite direction to that required for the inner peripheral location.

Since the attainment of temperatures sufficiently high to produce an appreciable number of fusion reactions depends upon the pinch effect, and the attainment of the pinch effect depends upon an induced current, it is obvious that the various confining chambers should be fabricated from materials which will not themselves carry an electrical current without high resistance. To this end, the toroidal reaction chamber 11, the primary coolant jacket 12, in the embodiment shown in FIGURES 1 and 2, and the inner and outer jackets 28 and 29 of FIGURE 3, are preferably fabricated from high electrical resistance materials. Insualtors 15 may be introduced between the various sections of the various toroidal chambers and jackets, if it is desired to use low electrical resistant materials, such as iron, in fabricating the various chambers and jackets.

The accelerated electrons and ions will continually collide, thereby transforming the induced circular unidirectional acceleration into directionally random acceleration. The effect of the resulting random energy distribution is to raise the temperature of the gas. As the temperature of the gas increases, an increasing number of fusion reactions occur.

The rate at which such reactions take place will increase steadily, since the energy imparted to the ions from the accelerated electrons is increasing. This increase is a result both of the increased energy of the electrons, and the increased density of the pinched area.

If it is assumed that the potential applied to the discharge is 20 v./cm. and that this potential has a time duration of about 20 $\mu$sec., the following sequence is representative of the relative time requirements for attainment of the various interactions taking place.

The pinched discharge, i.e., a full realization of the pinch effect, is attained about 6 $\mu$sec. after the primary current is applied. This pinch lasts for about from 3 to 10 $\mu$sec., and it is during this time that the gas attains a high temperature. After the pinch has existed for about 3 to 10 μsec., the kink instability affects its dissipation as hereinbefore described.

Since lateral instability destroys the pinch obtained after about 10 μsec., the symmetry of the gaseous discharge is destroyed, and the heated gas comes into contact with the confining walls. Because of this lateral instability the symmetrical arrangement of the transformers 32 in FIGURE 3 must be maintained. If symmetry is not maintained the unsymmetrical fields will increase the probability and extent of the lateral displacement, thereby reducing the time during which fusion reactions take place.

The energy liberated in the fusion reactions either raises the temperature of the gas or is lost to the outside in the form of neutrons and other escaping particles. As to the former, i.e., the energy imparted to the gas thereby raising its temperature, when the pinch is lost through lateral displacement so that the symmetry of the gaseous discharge is disrupted, the heated gas will come into contact with the walls imparting a portion of its energy to the walls. The coolants in the area 18 (see FIGURES 1 and 3) will thus be heated. The heated coolant is then passed through a heat exchanger so that the energy can be utilized.

The escaping particles, i.e., the protons, $He^3$, alpha particles, etc., will be absorbed either in the confining walls of the reaction chamber 11 or in the surrounding coolant thereby raising its temperature. The neutrons produced by the reaction taking place within the confined gas will be fast neutrons, i.e., they will have energies of from 2 to 14 mev. Therefore, they will not be captured or reduced to thermal energies by the coolant or confining chamber, but will escape from the system. The escaping neutrons may be utilized in any conventional manner, for example, to produce fission in a uranium jacket thereby producing heat, as is well known in the art.

One use for the neutrons liberated from the present device is shown by way of example in FIGURE 3. In this embodiment of the present invention a lithium coolant is used in the area 18. Lithium, which is not liquid at room temperature, requires a modification of the operating procedure and additional pre-heating apparatus. One method of operating the device using lithium in the primary coolant jacket is as follows. During start-up the secondary coolant, i.e., the sodium-potassium alloy present between the jackets 28 and 29, is relied on to remove the heat from the reactor until temperatures are sufficiently high to insure that any lithium present in the primary coolant jacket will remain liquid. This procedure presupposes the presence of a pre-heated lithium supply which maintains a source of liquid lithium. During shut-down the liquid lithium is drained from the primary coolant jacket and reliance is again placed upon the sodium-potassium alloy to carry the heat away from the reactor. The additional pre-heating apparatus may be of any type well known in the art.

Other means (not shown) may also be used. For example, steam pipes could be spaced within the primary coolant jacket, i.e., area 18, to insure that the lithium present remains in a liquid state during the time the reactor is not in operation.

In this embodiment the operation is the same as in the embodiment shown in FIGURE 1, described above, except that the neutrons are utilized within the reactor in the following manner. The neutrons liberated by the fusion reactions taking place within the reaction chamber 11 will bombard the lithium in the primary coolant jacket. This will result in the production of tritium in accordance with the reactions, and Thus, tritium will be produced within the liquid lithium flowing through the primary coolant jacket. This tritium may be separated from the materials present in any conventional manner, and represents a source of tritium for use within the reactor to attain a fusion reaction.

In both the embodiments described, one other source of useful energy is present. In the heated, ionized gas, the electrons are interacting with the ions, i.e., the electrons are inelastically colliding with the ions. These collisions, although confined to the pinched gas, give rise to bremsstrahlung as explained above.

Bremsstrahlung is easily absorbed by the surrounding materials, since the energies present are not large. This will result in the raising of the temperature of the surrounding liquid coolant. Thus the temperature of the coolant will be raised.

This then represents one cycle of operation of the device. With a time interval of about 20 μsec., for example, between discharge of the capacitors and subsequent recharge by the re-induced current, the present device, although in the nature of a pulsed reactor, represents a virtually constant supply of neutrons.

The attainment of fusion reactions is a result of applying an inducing voltage to the ionized gas which is sufficient to induce a current in the gas greater than the value required to obtain a pinch effect. This voltage must be applied for a time sufficient to insure that much of the energy of the electrons is transferred by collision to the gas ions thereby raising the gas temperature.

Furthermore, the reaction taking place is not allowed to assume uncontrolled proportions because the density of the gas within the chamber is low, i.e., about $10^{14}$ or $10^{15}$ particles per cc. but not more than $10^{16}$ particles per cc., and the amount of fusion fuel within the chamber upon which the pinch is acting will not sustain a fusion reaction for an extended length of time. The utilization of low density gaseous fusion fuels in the present device is the primary factor in controlling the rate of reaction within the chamber. Further control over the reaction taking place is present in the form of the electrical circuit connected to the primary coils. By merely disconnecting the energizing circuit for the primary coil or coils, the pinch effect will no longer be created in the gas, and therefore no fusion reaction will take place.

It is therefore apparent that the present invention provides a method and apparatus for attaining and controlling fusion reactions. Furthermore, means are provided whereby the energy released by the reactions is converted into various forms of useful energy, i.e., heated matter, electricity or radiation by-products.

While presently preferred embodiments of the invention have been described, it is clear that many other modifications may be made without departing from the scope of the invention. Therefore, the present invention is not limited by the foregoing description, but solely by the appended claims.

What is claimed is:

1. A source of neutrons and other radiations comprising a toroidal tube; diametrically opposed outlet and inlet conduits connected to said tube; a filling of gaseous hydrogen isotopes having at least one neutron per atom in said chamber; means located in said outlet and inlet conduits for ionizing said gas in said chamber; a first electrical means for inducing in said gas an electrical current sufficiently strong to produce therein a pinched discharge comprising a coil consisting of a series of windings symmetrically spaced around the periphery of said tube, said windings forming circles with the major axis center of said toroid as their center, second electrical means consisting of a coil symmetrically disposed adjacent the outside surface of said toroidal tube about a circle defining its minimum or maximum major circumference and a direct current power source connected to the ends of said coil, said coil extending over substantially the full line of said circumference and means surrounding said chamber for utilizing neutrons liberated by said reaction.

2. A source of neutrons and other radiations comprising a toroidal chamber; diametrically opposed outlet and inlet openings in said chamber; a filling of gaseous hydrogen isotopes having at least one neutron per atom in said chamber; means located in said outlet and said inlet for ionizing said gas in said chamber; first electrical means comprising a coil consisting of a series of windings symmetrically spaced around the periphery of said chamber, said windings forming circles with the major axis center of the toroid as their center for inducing an electrical current in said gas of a value greater than the current defined by the equation $I^2 = 3.2 \cdot 10^{-7} NT$, and second electrical means for preventing the outward radial drift of said pinched discharge current, consisting essentially of a coil symmetrically disposed adjacent the outside surface of said toroidal tube about a circle defining its minimum or maximum major circumference and a direct current power source connected to the ends of said coil, said coil extending over substantially the full lengths of said circumference.

3. A source of neutrons and other radiations comprising a chamber, within said chamber gaseous hydrogen isotopes having at least one neutron per atom, means for controlling the density of said gas, means for ionizing said gaseous hydrogen isotopes, first electrical means for inducing in said gas a sufficiently strong current to produce a pinched discharge comprising a series of transformers symmetrically spaced around said chamber each said transformer having a primary winding located on one of its sides whereby the transformer constitutes a link between said primary winding and the ionized gas within said chamber which acts as the secondary of each said transformer, and a second electrical means consisting essentially of a coil symmetrically disposed adjacent the outside surface of said toroidal tube about a circle defining its minimum or maximum major circumference and a direct current power source connected to the ends of said coil, said coil extending over substantially the full lengths of said circumference.

4. A source of neutrons and other radiations comprising an endless chamber, a gaseous hydrogen isotope having at least one neutron per atom in said chamber, means for ionizing said gaseous hydrogen isotope, first electrical means for inducing in said gas a sufficiently strong electrical current to produce a pinched discharge therein comprising a series of transformers symmetrically spaced around said chamber each said transformer having a primary winding on one side thereof, said transformer constituting a link between said primary winding and the ionized gas within said chamber which acts as the secondary winding of each said transformer, second electrical means consisting essentially of a coil symmetrically disposed adjacent the outside surface of said toroidal tube about a circle defining its minimum or maximum major circumference and a direct current power source connected to the ends of said coil, said coil extending over substantially the full length of said circumference, coolant means surrounding said chamber for extracting energy from said reaction, and a second coolant means surrounding said chamber and including a stable lithium isotope for utilizing neutrons escaping from said reaction in said chamber.

5. A method of obtaining neutrons and other radiations comprising the steps of supplying a low density gaseous hydrogen isotope having at least one neutron per atom to an endless enclosed reaction zone, ionizing said gas, applying an electric field to the charged particles of said ionized gas to accelerate them to a current of sufficient intensity to produce a pinch effect, maintaining said electric field in a symmetrical arrangement about said endless enclosed reaction zone to decrease the probability and extent of lateral displacement of said pinch and applying a radially inward force to said pinch to counterbalance the radially outward force of said pinch due to the stronger self-magnetic pressure on the inside of said pinch whereby the temperature of said gas is increased to produce fusion reactions in said gas.

6. A method of obtaining neutrons and other radiations comprising the steps of supplying a gaseous hydrogen isotope having at least one neutron per atom and an initial density of about $10^{14}$ to $10^{16}$ particles per cc. to an endless enclosed reaction zone, ionizing said gas to the charged particles in said gas to accelerate them to a current of sufficient intensity to produce a pinch effect, maintaining a symmetrical arrangement of said electric field about said endless enclosed reaction zone in order to maintain said pinch effect for a time sufficient to insure that the unidirectional motion of said charged particles has been transformed to random motion whereby the temperature of said gas is increased to produce fusion reactions, applying a radial counterbalancing force to said pinch to counterbalance the radial force on said pinch due to a stronger self-magnetic pressure on the inside of the pinch within said endless enclosed reaction zone.

7. A method of obtaining neutrons and other radiations comprising the steps of supplying a gaseous hydrogen isotope having at least one neutron per atom and an initial density of from about $10^{14}$ to $10^{16}$ particles per cc. to an endless enclosed reaction zone, ionizing said gas of at least five volts per cm. to said ionized gas particles to accelerate them to a current of sufficient intensity to produce a pinch effect, maintaining a symmetrical arrangement of said electrical field and applying a radially inward electrical force to said pinch to counterbalance the radial outward force on said pinch due to the stronger self-magnetic pressure on the inside of the pinch within said endless enclosed reaction zone whereby said pinch effect is maintained for at least 5 μsec. so that the unidirectional motion of said charged particles has been changed to random motion whereby the temperature of said gas is increased and fusion reactions are initiated in said gas.

8. A neutron source comprising a toroidal discharge tube, a filling of hydrogen gas consisting essentially of isotopes containing at least one neutron within said tube, a gas inlet conduit connected to said tube, a diametrically opposed gas outlet conduit connected to said tube, a first electrical means for ionizing said gas including electrodes disposed within said conduits, a second electrical means for inducing an electrical current in said gas sufficiently strong to produce a pinched discharge in said gas comprising a transformer the primary of which consists of a series of coils symmetrically spaced about said tube, the secondary of which consists of the ionized gas within said tube, and a third electrical means for preventing the outward radial drift of said pinched discharge current, said third electrical means consisting essentially of a coil symmetrically disposed adjacent the outside surface of said toroidal tube about a circle defining its minimum or maximum major circumference and a direct current power source connected to the ends of said coil, said coil extending over substantially the full length of said circumference.

9. A neutron source comprising a toroidal discharge chamber filled with a rarefied hydrogen gas consisting essentially of isotopes having more than one neutron, a first electrical means for ionizing said gas and electric field means adjacent said chamber for inducing a pinched discharge current in said ionized gas, a coil disposed coaxially with the major axis of said tube and symmetrically disposed about the equatorial plane of said tube, said coil extending over substantially the full major circumference of said tube, and power supply means for supplying direct current to said coils.

References Cited in the file of this patent

UNITED STATES PATENTS

| | | |
|---|---|---|
| 2,489,436 | Salisbury | Nov. 29, 1949 |
| 2,910,414 | Spitzer | Oct. 27, 1959 |

(Other references on following page)

UNITED STATES PATENTS

| | | |
|---|---|---|
| 2,991,238 | Phillips et al. | July 4, 1961 |
| 2,993,851 | Thomson et al. | July 25, 1961 |

FOREIGN PATENTS

| | | |
|---|---|---|
| 458,496 | Great Britain | Mar. 14, 1935 |
| 508,233 | Great Britain | June 28, 1939 |
| 637,866 | Great Britain | May 31, 1950 |
| 656,398 | Great Britain | Aug. 22, 1951 |
| 706,036 | Great Britain | Mar. 24, 1954 |
| 1,016,610 | France | Aug. 27, 1952 |

OTHER REFERENCES

Cousins, S. W., and Ware, A. A.: Proc. Phys. Soc. B64, 159–166 (1951).

Jet Propulsion, July 1953, pages 559–564, 575.

Atomics (October 1953), pages 253, 254.

Nucleonics (November 1955), pages 62–66.

Nucleonics (February 1956), pages 42–44.

Nucleonics (June 1956), pages 37–43, 123.

Project Sherwood by Amasa S. Bishop, Addison Wesley Pub. Co., Reading, Mass., 1958, pp. 24, 25, 29, 33–37. (In Lib.)